(12) United States Patent
Lai et al.

(10) Patent No.: US 11,776,441 B2
(45) Date of Patent: Oct. 3, 2023

(54) ROLLABLE DISPLAY DEVICE AND DRIVING METHOD THEREOF FOR CONTROLLING REFRESH RATE OF DISPLAY

(71) Applicant: Xiamen Tianma Display Technology Co., Ltd., Xiamen (CN)

(72) Inventors: Meng Lai, Xiamen (CN); Chen Zhong, Xiamen (CN); Jinjin Yang, Xiamen (CN); Yong Yuan, Shanghai (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 17/590,477

(22) Filed: Feb. 1, 2022

(65) Prior Publication Data
US 2023/0169899 A1  Jun. 1, 2023

(30) Foreign Application Priority Data
Nov. 30, 2021 (CN) .......................... 202111445896.0

(51) Int. Cl.
  *G09G 3/00* (2006.01)
  *G06F 3/044* (2006.01)
(52) U.S. Cl.
  CPC ............. *G09G 3/035* (2020.08); *G06F 3/044* (2013.01); *G09G 2310/0267* (2013.01); *G09G 2330/021* (2013.01); *G09G 2340/0435* (2013.01)
(58) Field of Classification Search
  CPC ........... G09G 3/035; G09G 2310/0267; G09G 2330/021; G09G 2340/0435; G09G 3/3275; G09G 3/20; G09G 5/00; G09G 3/342; G09G 3/3291; G09G 3/001; G06F 3/044; G06F 1/1652; G06F 1/1677; G06F 3/147; G09F 9/301; H05B 47/10; G02F 1/09; G02F 1/167; H05K 5/0217
  See application file for complete search history.

(56) References Cited

U.S. PATENT DOCUMENTS

| | | | |
|---|---|---|---|
| 2005/0176470 A1* | 8/2005 | Yamakawa | G09G 3/001 455/566 |
| 2008/0150885 A1* | 6/2008 | Overwijk | G02F 1/167 345/55 |

(Continued)

FOREIGN PATENT DOCUMENTS

CN           104461444 A  *  3/2015    ........... G06F 1/1652

*Primary Examiner* — Richard J Hong
(74) *Attorney, Agent, or Firm* — ANOVA LAW GROUP PLLC

(57) ABSTRACT

Display device and driving method thereof are provided. The display device includes a housing, a display screen, and a drive circuit. The housing includes a first side and a second side opposite to the first side in a first direction. The display screen includes a first end and a second end. At least one of the first end and the second end is accommodated in the housing. A first display area in a display area of the display screen is located between the first side and the second side. A second display area in the display area of the display screen is accommodated in the housing. The drive circuit is configured, when the display screen displays an image, to provide drive signals to the first display area, and control a display of the first display area without providing the drive signals to the second display area.

22 Claims, 12 Drawing Sheets

(56) References Cited

U.S. PATENT DOCUMENTS

| | | | |
|---|---|---|---|
| 2010/0033435 A1* | 2/2010 | Huitema | G09F 9/301 |
| | | | 345/173 |
| 2013/0036638 A1* | 2/2013 | Kwack | G09G 3/20 |
| | | | 235/494 |
| 2013/0314762 A1* | 11/2013 | Kwack | G02F 1/09 |
| | | | 359/280 |
| 2013/0334981 A1* | 12/2013 | Kwack | H05B 47/10 |
| | | | 315/291 |
| 2014/0002430 A1* | 1/2014 | Kwack | G09G 3/035 |
| | | | 345/207 |
| 2014/0194165 A1* | 7/2014 | Hwang | G06F 3/147 |
| | | | 455/566 |
| 2014/0380186 A1* | 12/2014 | Kim | G06F 1/1677 |
| | | | 715/746 |
| 2016/0358552 A1* | 12/2016 | Wang | G09G 3/342 |
| 2019/0197960 A1* | 6/2019 | Kim | G09G 3/035 |
| 2019/0302851 A1* | 10/2019 | In | G09G 3/20 |
| 2019/0364676 A1* | 11/2019 | Lee | H05K 5/0217 |
| 2020/0320908 A1* | 10/2020 | Kim | G09G 3/3275 |
| 2021/0181800 A1* | 6/2021 | Ko | G06F 1/1652 |
| 2022/0028314 A1* | 1/2022 | Kwon | G09G 3/3291 |
| 2022/0151091 A1* | 5/2022 | Kang | G06F 1/1652 |
| 2022/0189408 A1* | 6/2022 | Jo | G09G 5/00 |

\* cited by examiner

ROLLABLE DISPLAY DEVICE AND DRIVING METHOD THEREOF FOR CONTROLLING REFRESH RATE OF DISPLAY

CROSS-REFERENCE TO RELATED APPLICATION

This application claims priority of Chinese Patent Application No. 202111445896.0, filed on Nov. 30, 2021, the entire contents of which are hereby incorporated by reference.

FIELD OF THE DISCLOSURE

The present disclosure generally relates to the field of display technology and, more particularly, relates to a display device and a driving method thereof.

BACKGROUND

With a development of display technology, flexible display screens are more and more widely used, bringing great conveniences to people's daily work and life. At present, a rollable display device has been developed to provide a display device that can not only provide a relatively large display area, but also have a relatively small storage space. Specifically, the rollable display device includes a housing and a flexible display screen. When the rollable display device is applied to a scenario requiring a relatively large display area, all the display area of the flexible display screen protrudes from the housing to provide the relatively large display area. When the rollable display device is not configured for display, at least part of the display area of the flexible display screen is accommodated in the housing, so that the display device has a relatively small storage space. However, the current rollable display device consumes a lot of power when applied to a scenario with a small display area.

BRIEF SUMMARY OF THE DISCLOSURE

One aspect of the present disclosure provides a display device. The display device includes a housing, a display screen, and a drive circuit. The housing includes a first side and a second side opposite to the first side in a first direction. The display screen includes a first end and a second end. At least one of the first end and the second end is accommodated in the housing. A first display area in a display area of the display screen is located between the first side and the second side. A second display area in the display area of the display screen is accommodated in the housing. The drive circuit is configured, when the display screen displays an image, to provide drive signals to the first display area and control a display of the first display area without providing drive signals to the second display area.

Another aspect of the present disclosure provides a driving method. The driving method includes scanning each display pixel row of the first display area of the display screen line by line, providing drive signals to the first display area, and controlling a display of the first display area when scanning the first display area of the display screen; and stopping outputting the drive signals so as not to provide the drive signals to the second display area when scanning the second display area of the display screen.

Other aspects of the present disclosure can be understood by a person skilled in the art in light of the description, the claims, and the drawings of the present disclosure.

BRIEF DESCRIPTION OF THE DRAWINGS

To describe technical solutions more clearly in embodiments of the present disclosure or existing technologies, the following will briefly introduce accompanying drawings that need to be used in the description of the embodiments or the existing technologies. Obviously, the accompanying drawings in the following description are only some embodiments of the present disclosure. For a person skilled in the art, other drawings can be obtained from the accompanying drawings without creative efforts.

DETAILED DESCRIPTION

The following will clearly and completely describe the technical solutions in the embodiments of the present disclosure with reference to the accompanying drawings in the embodiments of the present disclosure. Obviously, the described embodiments are only part of the embodiments of the present disclosure, rather than all the embodiments. Based on the embodiments of the present disclosure, all other embodiments obtained by a person skilled in the art without creative efforts shall fall within the protection scope of the present disclosure.

In the following description, many specific details are explained to fully understand the present disclosure. However, the present disclosure may also be implemented in other ways different from the ways described herein. A person skilled in the art may make similar promotions without violating a connotation of the present disclosure. Therefore, the present disclosure is not limited by the specific embodiments disclosed below.

A rollable display device consumes a significant amount of power when applied to a scenario with a relatively small display area.

When the current rollable display device is applied to a scenario with a relatively small display area, only part of the display area of the flexible display screen is accommodated in the housing, and part of the display area of the flexible display screen is exposed outside the housing. However, the entire display area of the flexible display screen is displayed, that is, the part of the display area of the flexible display screen accommodated in the housing is also displayed, thereby resulting in a high-power consumption of the display device.

Figure 1:
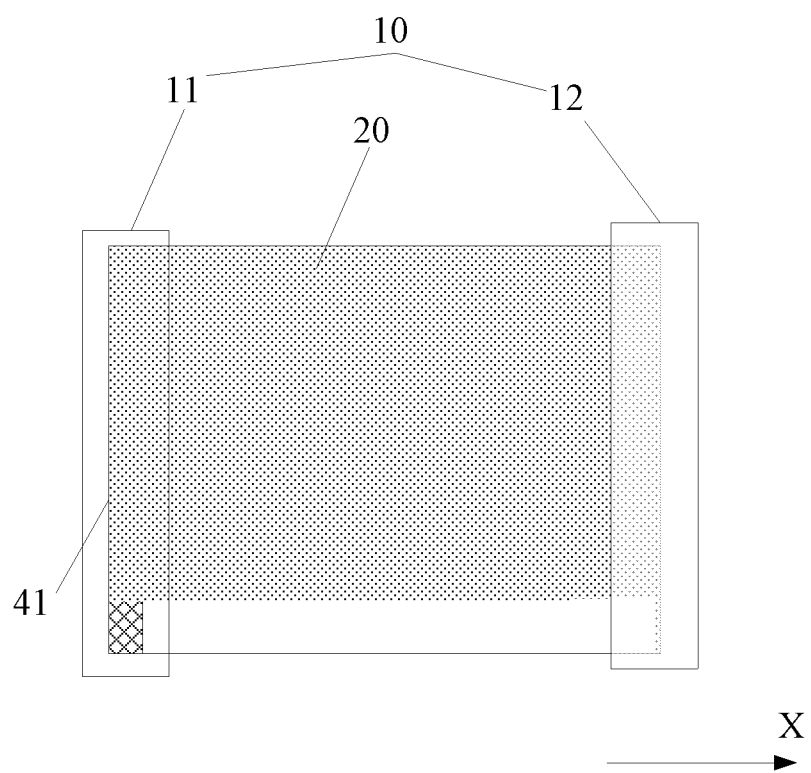
FIG. 1 illustrates a top view of a display device provided by an embodiment of the present disclosure.
Figure 2:
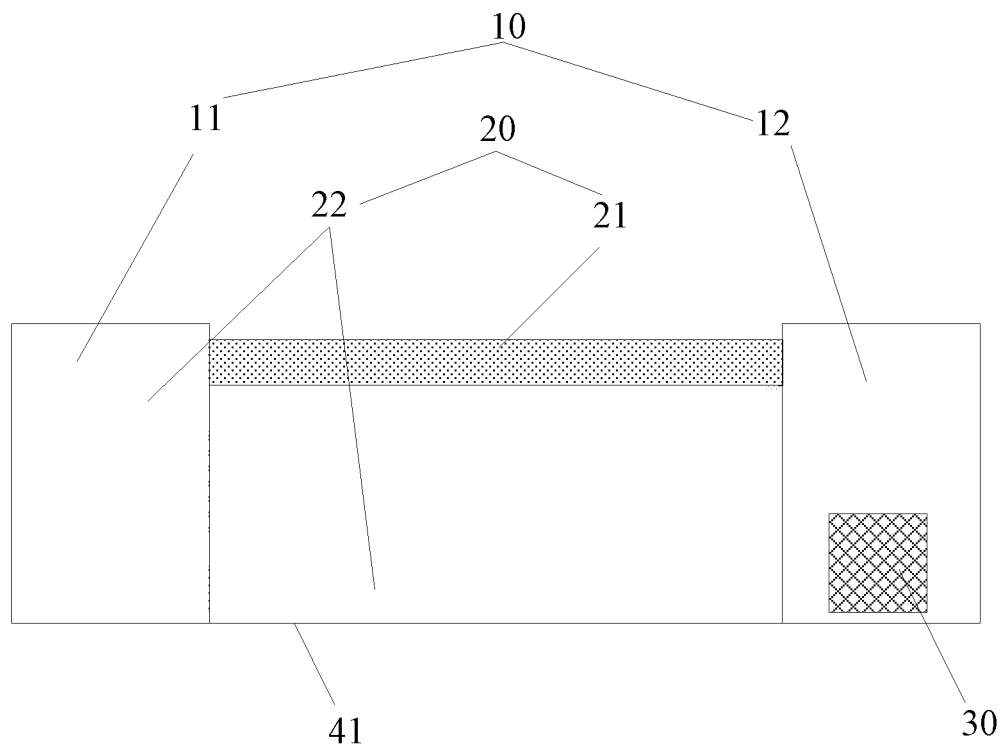
FIG. 2 illustrates a cross-sectional view of a display device provided by an embodiment of the present disclosure.

In view of the above, one embodiment of the present disclosure provides a display device. As shown in FIGS. 1 and 2, the display device includes a housing 10, a display screen 20 and a drive circuit 30. The housing 10 includes a first side 11 and a second side 12 opposite to the first side 11 in a first direction X. The display screen 20 includes a first end and a second end. At least one of the first end and the second end is accommodated in the housing 10. Optionally, the display screen 20 is a flexible display screen. Specifically, a first display area 21 in a display area of the display screen 20 is located between the first side 11 and the second side 12 and is visible to users, and a second display area 22 in the display area of the display screen 20 is accommodated in the housing 10 and is invisible to the users, so that part of the display area of the display screen 20 is exposed outside, and part of the display area of the display screen 20 is accommodated in the housing 10. The drive circuit 30 is configured, when the display screen displays an image, to provide drive signals to the first display area 21 to control a display of the first display area 21, and not provide the drive signals to the second display area 22 to control the second display area 22 not to display.

Optionally, based on the above embodiment, in one embodiment, as shown in FIGS. 1 and 2, the first end of the display screen 20 is accommodated in the housing 10. The second display area 22 is located on a side of the first display area 21 away from the second side 12 of the housing 10. Specifically, the first end of the display screen 20 is slidably connected to a first rotating shaft 41 fixed to the first side 11 of the housing 10 to realize an adjustment of a display area of the first display area 21.

Figure 3:
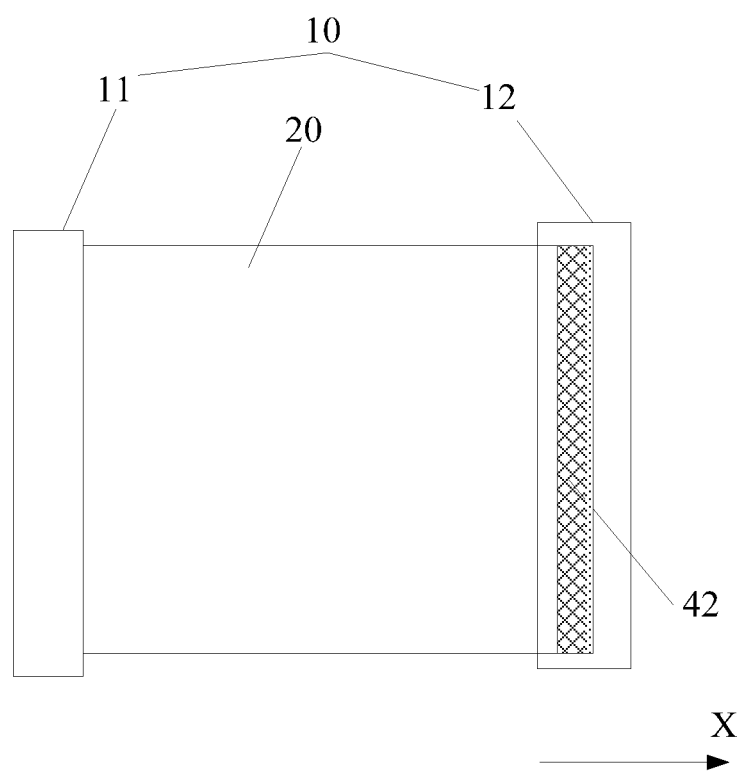
FIG. 3 illustrates a top view of a display device provided by another embodiment of the present disclosure.
Figure 4:
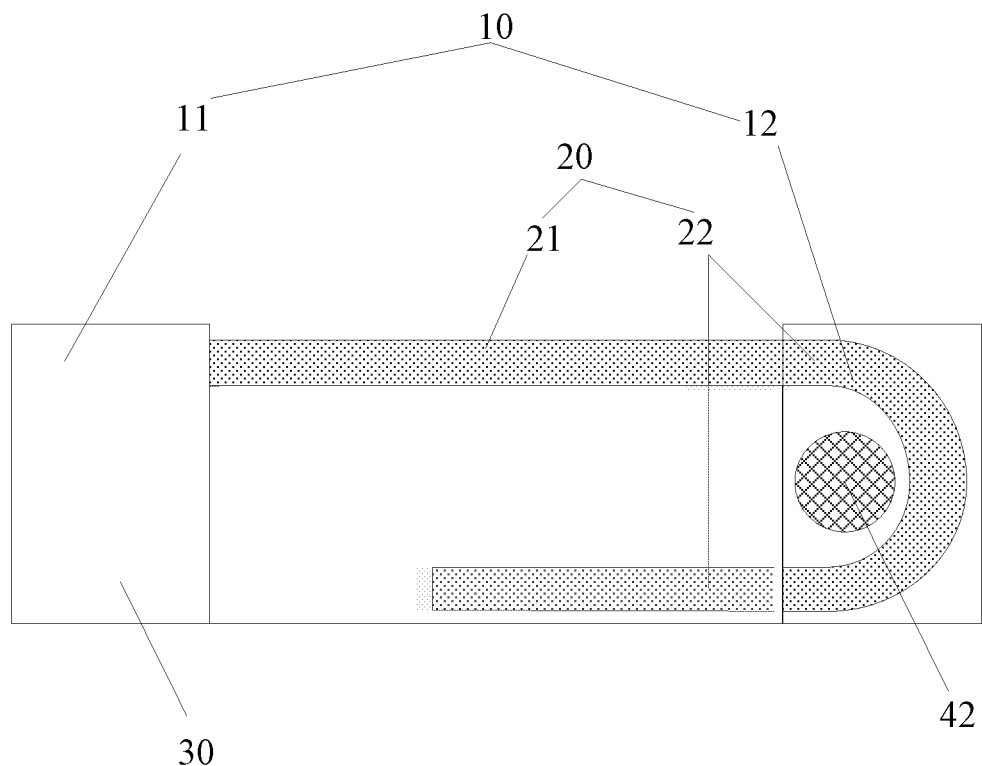
FIG. 4 illustrates a cross-sectional view of a display device provided by another embodiment of the present disclosure.

In one embodiment, as shown in FIGS. 3 and 4, the first end of the display screen 20 is fixed to the first side 11 of the housing 10. The second end of the display screen 20 is accommodated in the housing 10. The second display area 22 is located on the side of the first display area 21 away from the first side 11 of the housing 10. Specifically, the second end of the display screen 20 is slidably connected to a second rotating shaft 42 fixed to the second side 12 of the housing 10 to realize an adjustment of the display area of the first display area 21.

Figure 5:
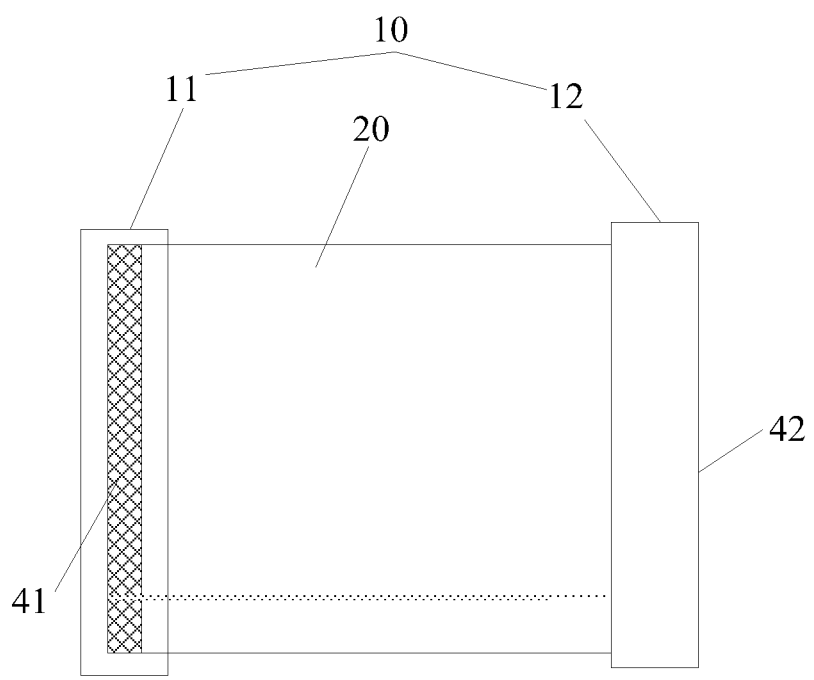
FIG. 5 illustrates a top view of a display device provided by another embodiment of the present disclosure.
Figure 6:
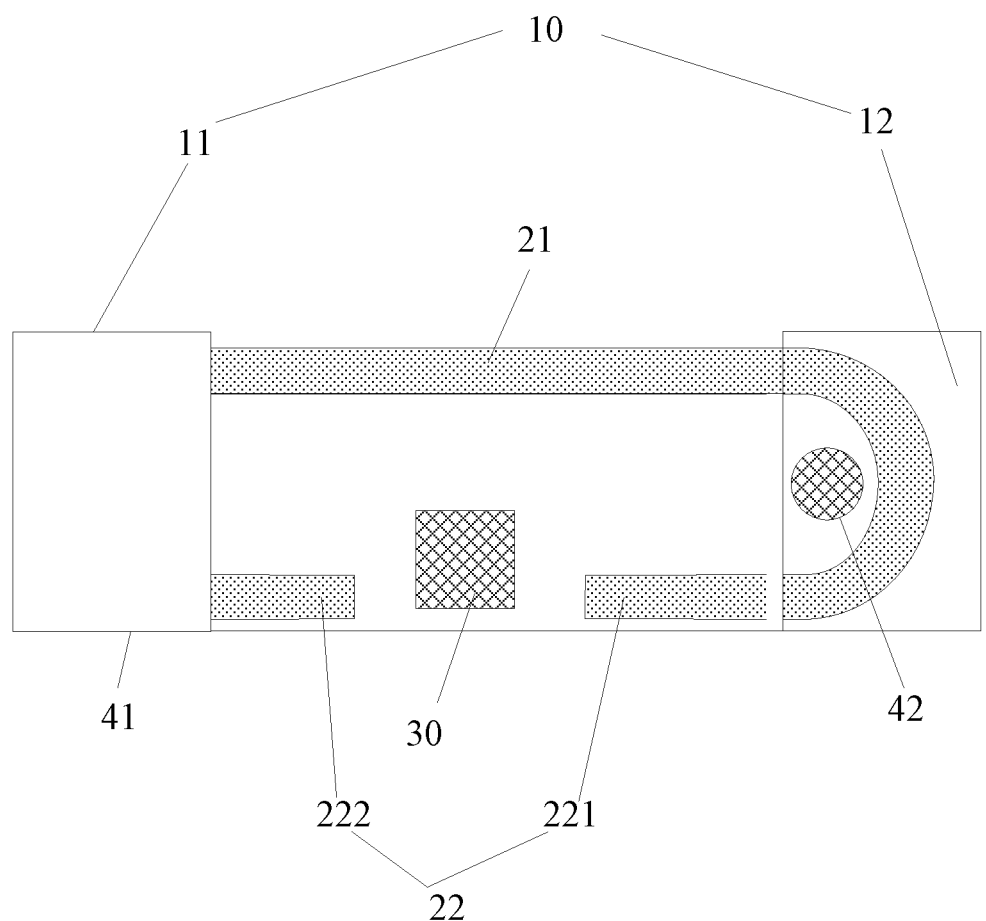
FIG. 6 illustrates a cross-sectional view of a display device provided by another embodiment of the present disclosure.

In one embodiment, as shown in FIGS. 5 and 6, both the first end and the second end of the display screen 20 are accommodated in the housing 10. The second display area 22 includes a first sub display area 221 and a second sub display area 222. The first sub display area 221 is located on the side of the first display area 21 away from the first side 11 of the housing 10 and is accommodated in the housing 10. The second sub display area 222 is located on the side of the first display area 21 away from the second side 12 of the housing and is accommodated in the housing 10.

The display device provided by the embodiments of the present disclosure is configured for displaying display content when part of the display area is exposed outside the housing. When part of the display area is accommodated in the housing, the drive circuit only controls the first display area to display, and control the second display area not to display, so as to save a power consumption of the drive circuit for driving the second display area for display, thereby reducing a power consumption of the display device.

Figure 7:
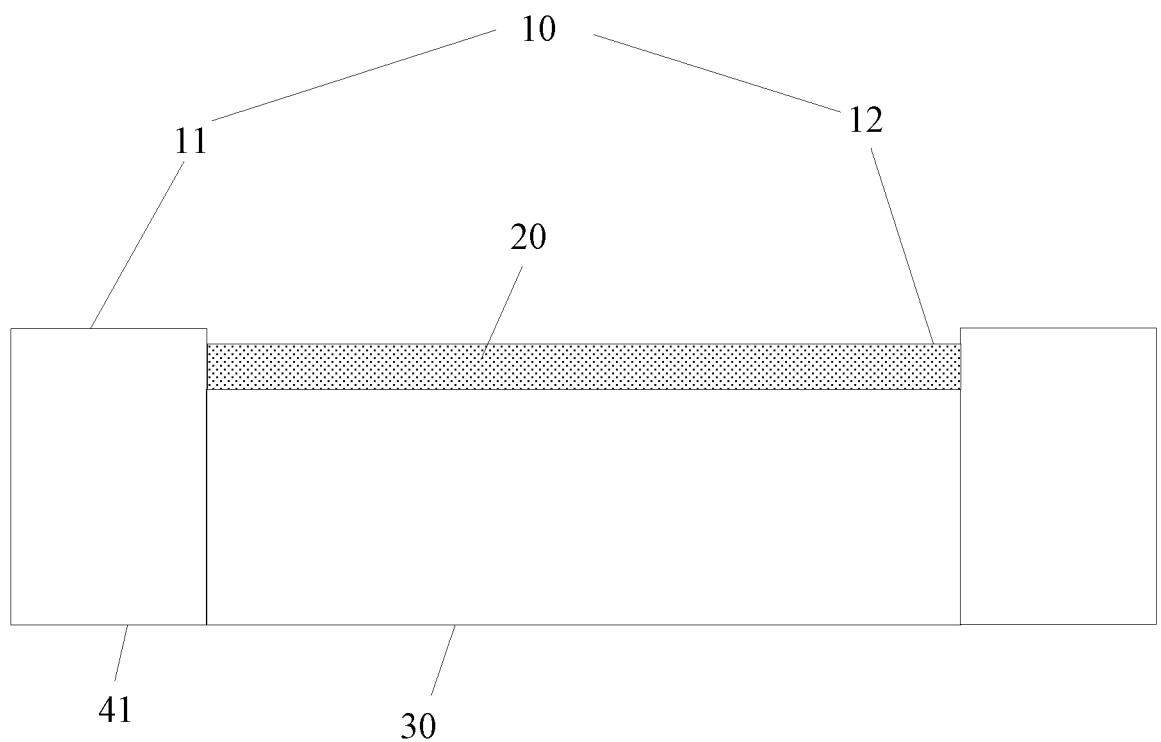
FIG. 7 illustrates a top view of a display device provided by another embodiment of the present disclosure.
Figure 8:
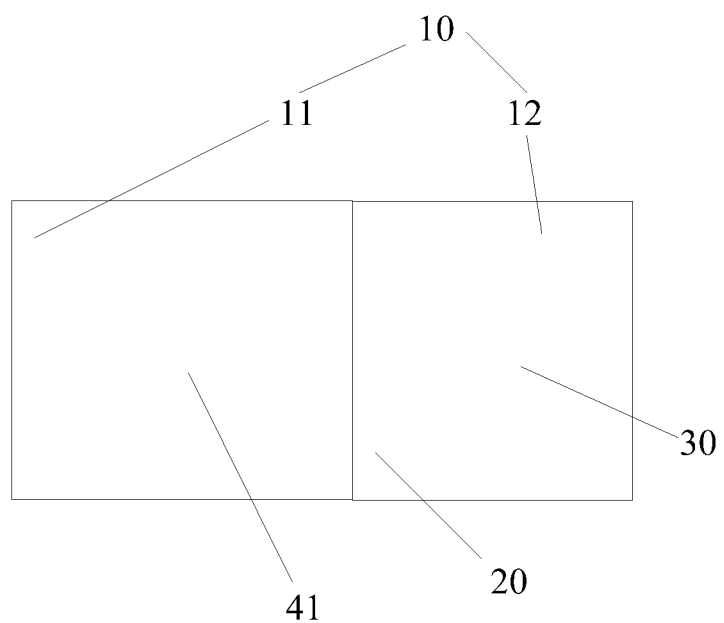
FIG. 8 illustrates a cross-sectional view of a display device provided by another embodiment of the present disclosure.

In the above embodiments, part of the display area of the display screen exposed outside the housing and part of the display area of the display screen accommodated in the housing is only one application scenario of the display device. The display device can also be applied to other scenarios. Specifically, in one embodiment, when a display area required by an application scenario of the display device is less than a maximum display area of the display device, as shown in FIG. 2, part of the display area of the display screen 20 protrudes from the housing, is exposed outside the housing and is visible to users, part of the display area is accommodated in the housing and is invisible to the users. When the display area required by the application scenario of the display device is greater than or equal to the maximum display area of the display device, as shown in FIG. 7. the entire display area of the display screen 20 protrudes from the housing, is exposed outside the housing and is visible to the user. When the display device is not configured for display, as shown in FIG. 8, the entire display area of the display screen 20 is accommodated in the housing 10. The display area of the display screen 20 is not limited herein and depends on a storage space and a usage requirement of the housing.

Figure 9:
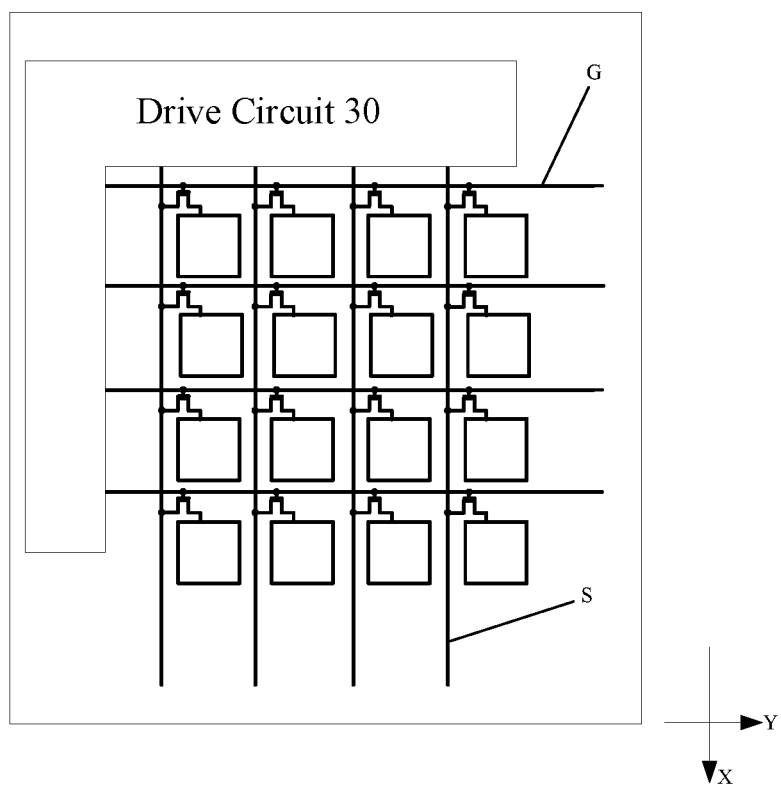
FIG. 9 illustrates a schematic diagram of an internal structure of a display device provided by an embodiment of the present disclosure.

Based on any of the above embodiments, in one embodiment, as shown in FIG. 9, the display screen includes a plurality of scan lines G extending along a second direction Y and a plurality of data lines S extending along the first direction X. The second direction Y intersects the first direction X, that is, an extension direction of the scan lines G intersects an extension direction of the data lines S. When the display screen is configured to display content, the drive circuit 30 provides a data drive signal to each of the data lines S.

Based on the above embodiment, in one embodiment, when the entire display area of the display device is configured for display, the drive circuit 30 provides a data drive signal to each of the data lines S and a scan drive signal to each of the scan lines G to control all the display area of the display screen for display. When the display device is not configured for display, the drive circuit 30 does not provide a data drive signal to each of the data lines S and does not provide a scan drive signal to each of the scan lines G and control all the display area of the display screen not to display. When part of the display area of the display device is configured for display, and part of the display area is not configured for display, the drive circuit 30 provides a data drive signal to each of the data lines S, provides scan drive signals to part of the scan lines G, and does not provide the scan drive signals to part of the scan lines G, so as to control part of the display area of the display screen to display and part of the display area not to display, thereby reducing a power consumption of the display device.

In combination with specific conditions, the following describes a scenario when part of the display area of the display device is configured for display and part of the display area is not configured for display.

Figure 10:
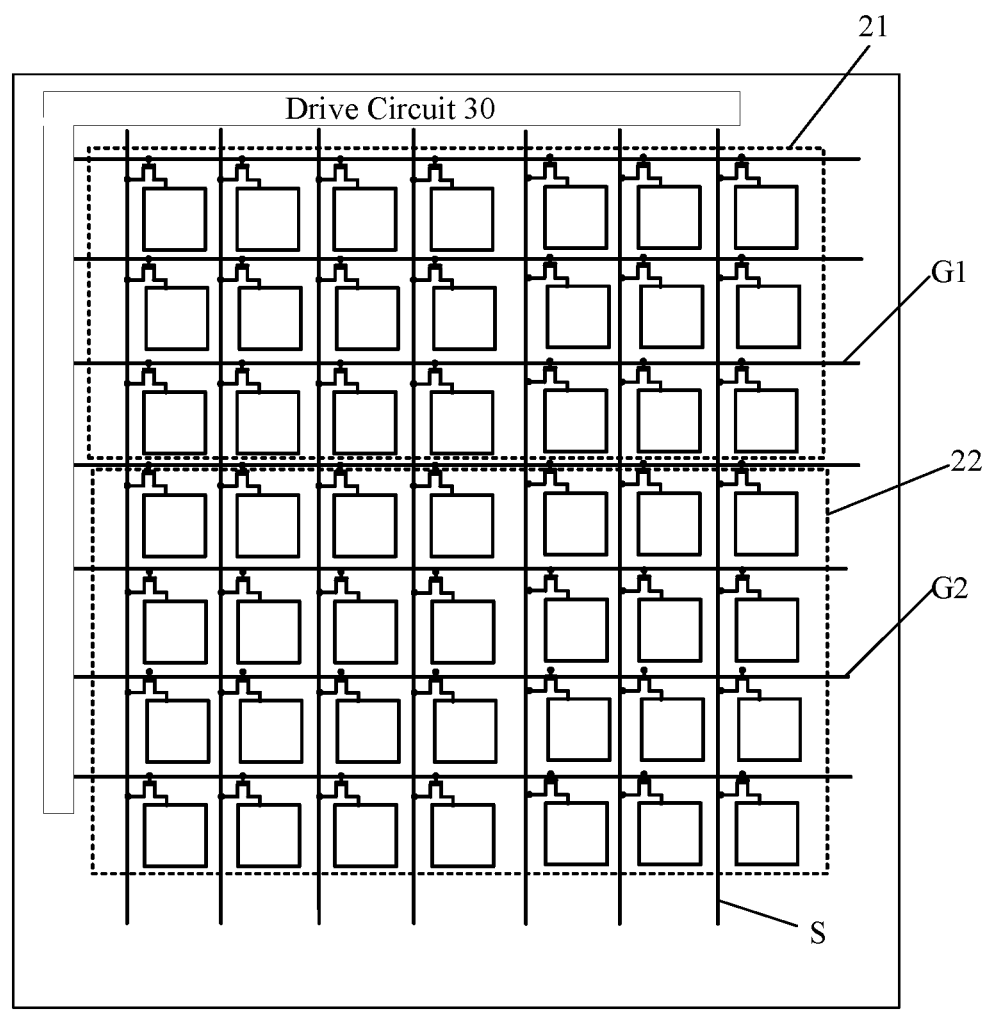
FIG. 10 illustrates a schematic diagram of an internal structure of a display device provided by another embodiment of the present disclosure.

Specifically, in one embodiment, as shown in FIG. 10, the drive circuit 30 is configured to provide scan drive signals to scan lines G1 of the first display area 21 to control the first display area 21 to display, and not provide the scan drive signals to scan lines G2 of the second display area 22 to control the second display area 22 not to display, so as to save a power consumption of the second display area 22 for display, thereby reducing a power consumption of the display device during an operation.

Figure 11:
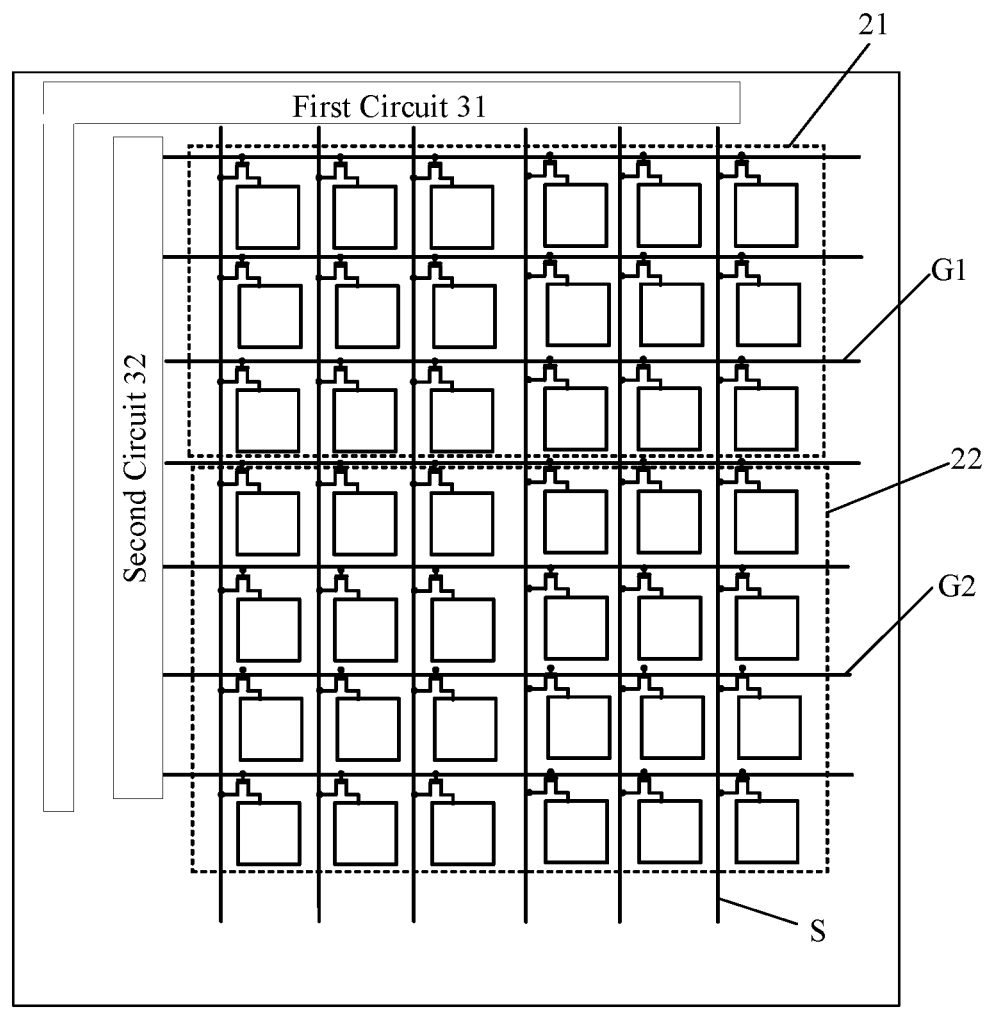
FIG. 11 illustrates a schematic diagram of an internal structure of a display device provided by another embodiment of the present disclosure.

Based on the above embodiment, in one embodiment, as shown in FIG. 11, the drive circuit includes a first circuit 31 and a second circuit 32. The first circuit 31 is configured to provide scanning signals required by the display area of the display screen, the second circuit 32 is configured to control an on state of a path between the first circuit 31 and the display area of the display screen, to pass through at least one of the first circuit 31 and the second circuit 32. When part of the display area of the display device is configured for display, and part of the display area is not configured for display, the drive circuit controls part of the display area of the display screen to display, and part of the display area not to display, thereby reducing a power consumption of the display device.

Optionally, based on the above embodiment, in one embodiment, as shown in FIG. 11, the second circuit 32 is in an on state, and the first circuit 31 provides scan drive signals for the scan lines G1 of the first display area 21 but does not provide the scan drive signals to the scan lines G2 of the second display area 22. Specifically, each scan line in the display screen is scanned line by line. When the drive circuit is configured to provide the scan drive signals to the scan lines G1 of the first display area 21, the first circuit 31 outputs the scan drive signals, and the second circuit 32 is in an on state, when the drive circuit is configured to provide the scan drive signals to the scan lines G2 of the second display area 22, the first circuit 31 does not output the scan drive signals, and the second circuit 32 is in an on state. A power consumption of the display device is reduced by saving a power consumption of the scan drive signals outputted by the first circuit 31.

In one embodiment, the first circuit provides scan drive signals to the first display area and the second display area. As shown in FIG. 11, the second circuit 32 is in an on state when the first circuit 31 provides the scan drive signals to the scan lines G1 of the first display area 21. The second circuit 32 is in an off state when the first circuit 31 provides the scan drive signals to the scan lines G2 of the second display area. That is, when the drive circuit is configured to provide the scan drive signals to the scan lines G1 of the first display area 21, the first circuit 31 outputs the scan drive signals, and the second circuit 32 is in an on state, when the drive circuit is configured to provide the scan drive signals to the scan lines G2 of the second display area 32, the first circuit 31 outputs the scan drive signals, and the second circuit 32 is in an off state. A power consumption of the display device is reduced by saving a power consumption of the second circuit 32 if the second circuit 32 is in an on state.

In one embodiment, as shown in FIG. 11, the first circuit 31 provides scan drive signals to the scan lines G1 of the first display area 21 but does not provide the scan drive signals to the scan lines G2 of the second display area 22. The second circuit 32 is in an on state when the first circuit 31 provides the scan drive signals to the scan lines G1 of the first display area 21. The second circuit 32 is in an off state when the first circuit 31 provides the scan drive signals to the scan lines G2 of the second display area 22. That is, when the drive circuit is configured to provide the scan drive signals to the scan lines G1 of the first display area 21, the first circuit 31 outputs the scan drive signals, and the second circuit 32 is in an on state, when the drive circuit is configured to provide the scan drive signals to the scan lines G2 of the second display area 32, the first circuit 31 does not output the scan drive signals, and the second circuit 32 is in an off state. A power consumption of the display device is reduced by saving a power consumption of the first circuit 31 for outputting the scan driving signals and a power consumption when the second circuit 32 is turned on.

Specifically, based on the above embodiment, in one embodiment, the first circuit includes a control circuit IC, a scan line drive circuit (i.e., a gate drive circuit), and a data line drive circuit. The control circuit is configured to provide drive signals to the scan line drive circuit and to provide drive signals to the data line drive circuit. The scan line drive circuit is configured to provide a scan drive signal for each scan line in the display area of the display screen. The data line drive circuit is configured to provide a data drive signal for each data line in the display area of the display screen.

Optionally, in one embodiment, when the first circuit does not provide drive signals to the second display area, the control circuit IC outputs stop and reset signals to the scan line drive circuit so that the scan line drive circuit does not output scan drive signals.

Since the scan line drive circuit and the data line drive circuit account for a large proportion of a power consumption of the display device, when the display device provided by the embodiments of the present disclosure is applied to a scenario with a small display area, a power consumption of the scan line drive circuit to drive the second display area can be saved, thereby significantly reducing a power consumption of the display device.

Figure 12:
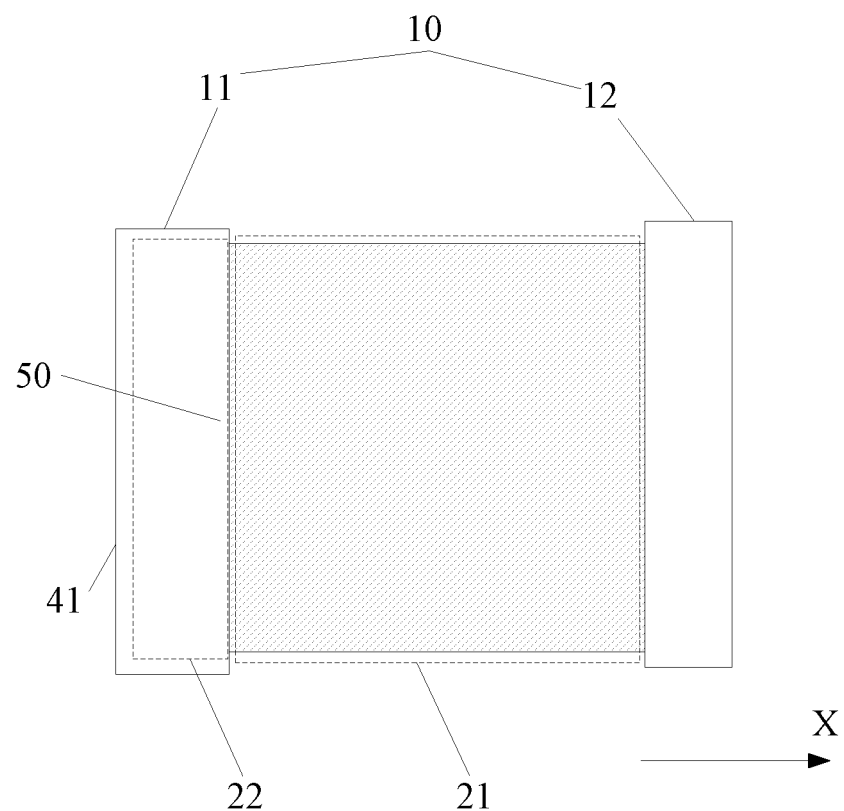
FIG. 12 illustrates a top view of a display device provided by another embodiment of the present disclosure.

Based on any of the above embodiments, in one embodiment, as shown in FIG. 12, the display device further includes a detection element 50. The detection element 50 is configured to determine locations of the first display area 21 and the second display area 22 in the display area of the display screen, to facilitate the drive circuit to determine when to output scan drive signals and when not to output the scan drive signals. Therefore, when the scanning lines of the first display area 21 are scanned, the drive circuit outputs the scan drive signals, and when the scanning lines of the second display area 22 are scanned, the drive circuit does not output the scan drive signals.

Based on the above embodiment, in one embodiment, the display screen includes a touch detection element. The touch detection element includes at least one conductive member fixed on at least one of the first side and the second side of the housing. Touch signals are located between the at least one conductive member and the touch detection element. The drive circuit is further configured to determine a dividing line between the first display area and the second display area based on the touch signals, to determine the locations of the first display area and the second display area in the display area of the display screen.

Figure 13:
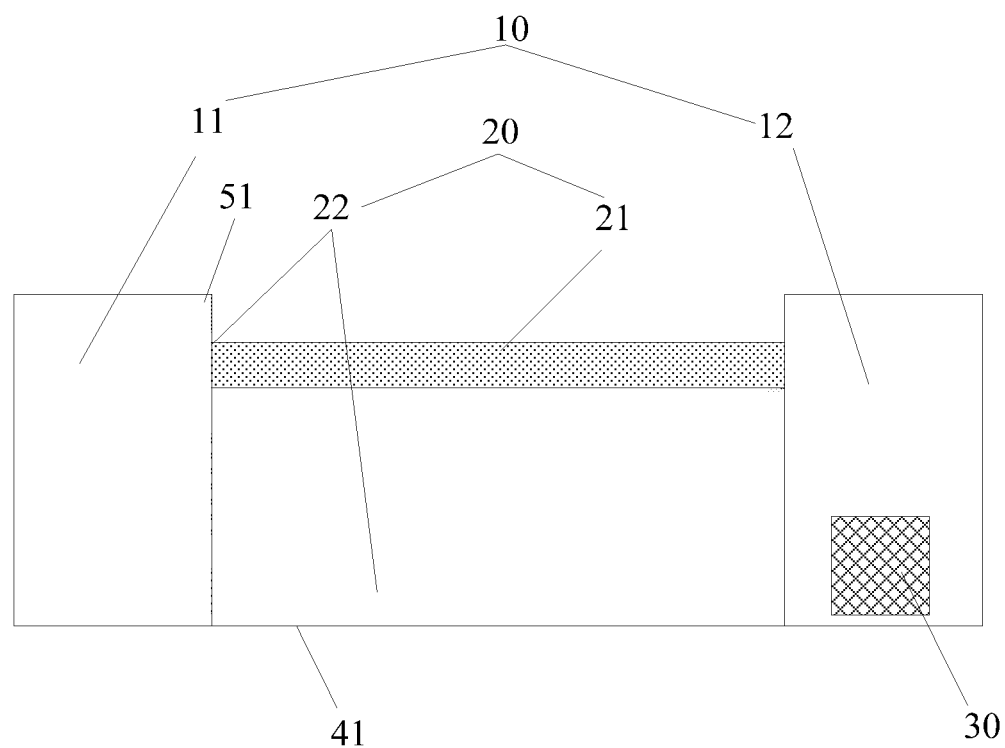
FIG. 13 illustrates a cross-sectional view of a display device provided by another embodiment of the present disclosure.

Specifically, in one embodiment, as shown in FIG. 13, the first end of the display screen 20 is accommodated in the housing 10, the second end of the display screen 20 is fixed to the second side 12 of the housing 10, and the second display area 22 is located on the side of the first display area 21 away from the second side 12 of the housing 10. The at least one conductive member 51 is fixed on the first side 11 of the housing 10. The drive circuit 30 determines, based on the touch signals between the at least one conductive member 51 and the touch detection element in the display screen 20, a first position of the at least one conductive member 51 corresponding to the display screen 20. A display area between the first position in the display screen 20 and the first end of the display screen 20 is the second display area 22. A display area between the first position in the display screen 20 and the second end of the display screen 20 is the first display area 21.

Figure 14:
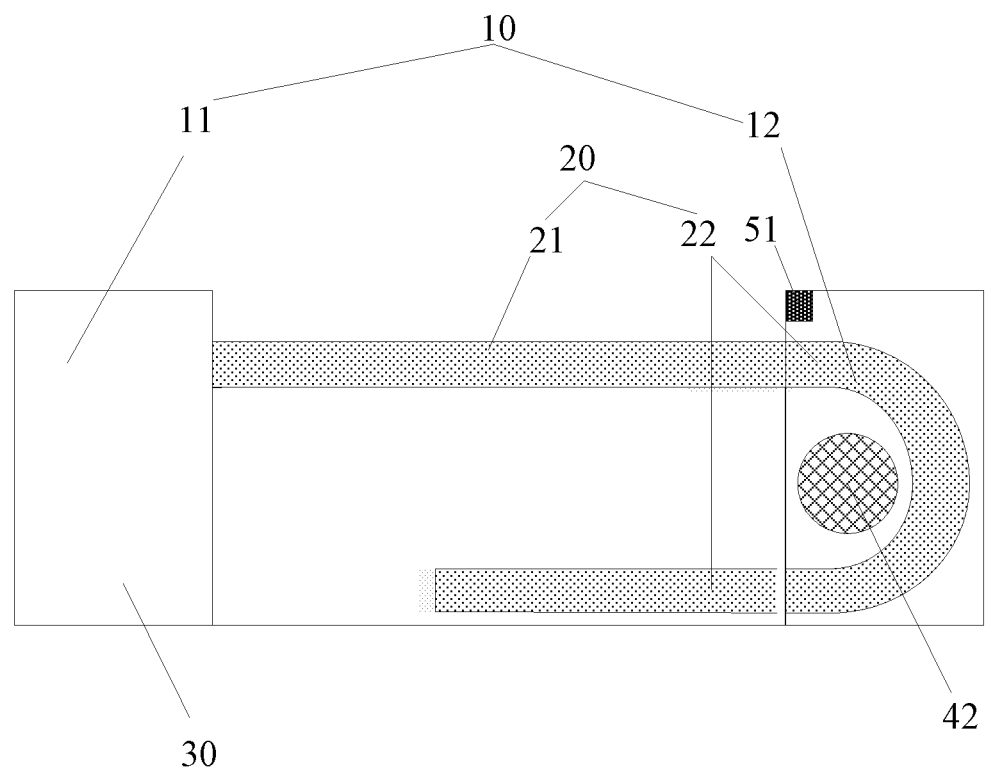
FIG. 14 illustrates a cross-sectional view of a display device provided by another embodiment of the present disclosure.

In one embodiment, as shown in FIG. 14, the first end of the display screen 20 is fixed to the first side 11 of the housing 10, the second end of the display screen 20 is accommodated in the housing 10, and the second display area 22 is on the side of the first display area 21 away from the first side 11 of the housing 10. The at least one conductive member 51 is fixed on the second side 12 of the housing 10. The drive circuit 30 determines, based on the touch signals between the at least one conductive member 51 and the touch detection element in the display screen 20, the first position of the at least one conductive member 51 corresponding to the display screen 20. The display area between the first position in the display screen 20 and the first end of the display screen 20 is the first display area 21. The display area between the first position in the display screen 20 and the second end of the display screen 20 is the second display area 22.

In one embodiment, the first end of the display screen is accommodated on the first side of the housing, and the second end of the display screen is accommodated on the second side of the housing. The second display area includes a first sub display area and a second sub display area respectively located on two sides of the first display area in the first direction. The at least one conductive member includes at least two conductive members. The at least two conductive members partly located on a first side of the housing are denoted as first conductive members. The at least two conductive members partly located on a second side of the housing are denoted as second conductive members. The drive circuit determines, based on the touch signals between the first conductive members and the touch detection element in the display screen, a second position in the display screen corresponding to the first conductive members. The drive circuit determines, based on the touch signals between the second conductive members and the touch detection element in the display screen, a third position in the display screen corresponding to the second conductive members. The first display area is located between the second position of the display screen and the third position of the display screen. The first sub display area is located between the second position and the second end of the display screen. The second sub display area is located between the first position and the first end of the display screen.

In the above embodiments, the locations of the first display area and the second display area in the display area of the display screen are determined by the touch signals between the at least one conductive member and the touch detection element in the display screen. In other embodiments, the locations of the first display area and the second display area in the display area of the display screen may also be determined in other ways.

Figure 15:
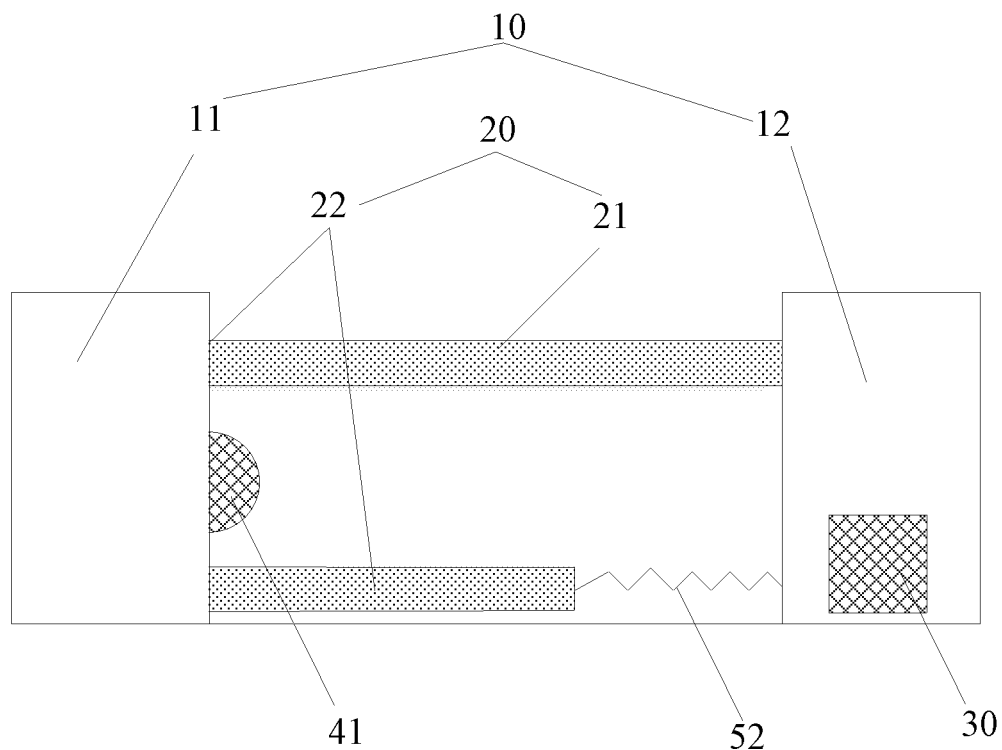
FIG. 15 illustrates a cross-sectional view of a display device provided by another embodiment of the present disclosure.

Optionally, in one embodiment, as shown in FIG. 15, the detection element includes a resistor element 52 fixedly connected to a side of the second display area 22 away from the first display area 21. The drive circuit 30 is further configured to determine the locations of the first display area 21 and the second display area 22 in the display area of the display screen 20 based on a resistance change of the resistor element 52.

Specifically, based on the above embodiment, in one embodiment, as shown in FIG. 15, the first end of the display screen 20 is accommodated in the housing 10, the second end of the display screen 20 is fixed to the second side 12 of the housing 10, and the second display area 22 is located on the side of the first display area 21 away from the second side 12 of the housing 10. One end of the resistor element 52 is fixedly connected to the first end of the display screen 20, and another end of the resistor element 52 is fixed in the housing 10. When a display area (i.e., an area of the first display area 21) between the second end of the display screen 20 and the first side 11 of the housing 10 in the display area of the display screen 20 increases, a resistance of the resistor element 52 changes along a third direction A1. When the display area (i.e., the area of the first display area 21) between the second end of the display screen 20 and the first side 11 of the housing 10 in the display area of the display screen 20 decreases, the resistance of the resistor element 52 changes along a fourth direction. Therefore, the drive circuit 30 can determine, based on the resistance change of the resistor element 52, the locations of the first display area 21 and the second display area 22 in the display area of the display screen 20. The third direction is opposite to the fourth direction.

Based on the above embodiment, in one embodiment, as shown in FIG. 15, the resistor element 52 includes a resistance wire. When the area of the first display area 21 increases, a length of the resistance wire increases, and the resistance of the resistor element 52 increases. When the area of the first display area 21 decreases, the length of the resistance wire decreases, and the resistance of the resistor element 52 decreases. Therefore, the drive circuit 30 can determine, based on a resistance change of the resistance wire, the locations of the first display area 21 and the second display area 22 in the display area of the display screen.

Figure 16:
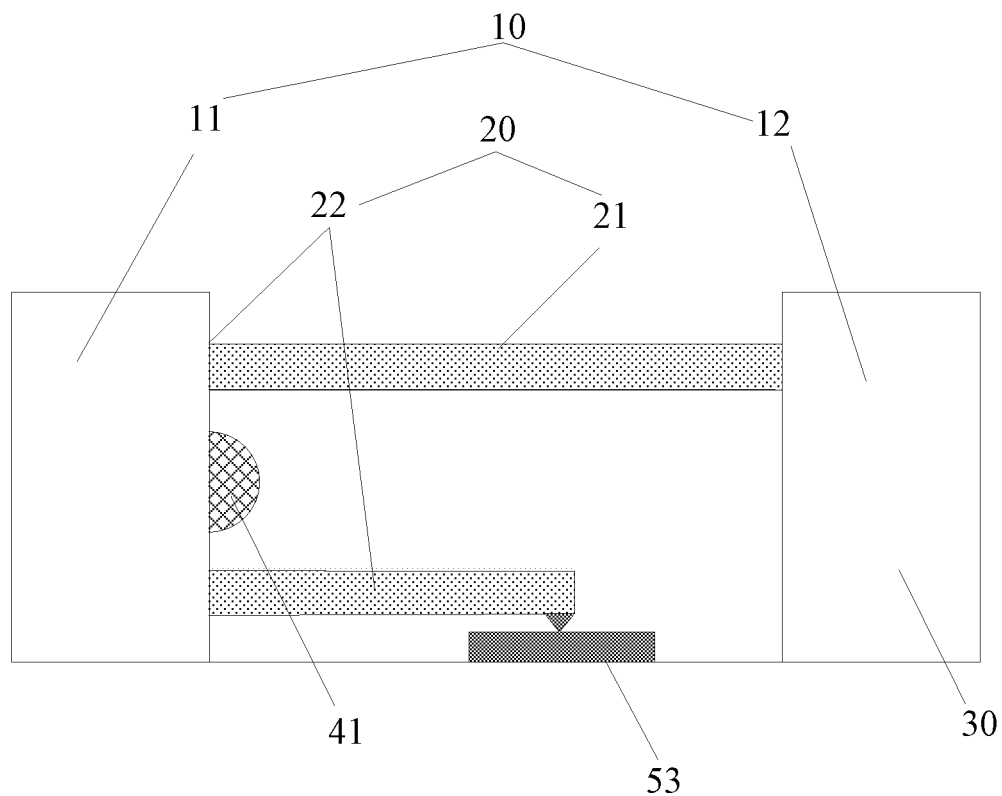
FIG. 16 illustrates a cross-sectional view of a display device provided by another embodiment of the present disclosure.

In one embodiment, as shown in FIG. 16, the resistor element includes a sliding rheostat 53. An end of the second display area 22 away from the first display area 21 is fixedly connected to a sliding end of the sliding rheostat 53. When the area of the first display area 21 changes, the sliding end of the sliding rheostat 53 slides on the sliding rheostat 53, so that a resistance length of the sliding rheostat 53 connected to a circuit change. Specifically, when a length of the sliding rheostat 53 connected to the circuit increases, a resistance of the sliding rheostat 53 increases. When the length of the sliding rheostat 53 connected to the circuit decreases, the resistance of the sliding rheostat 53 decreases. Therefore, the drive circuit 30 can determine, based on a resistance change of the sliding rheostat 53, the locations of the first display area 21 and the second display area 22 in the display area of the display screen 20.

In the above embodiment, if an end of the sliding rheostat close to the first side of the housing and the sliding end of the sliding rheostat are connected to the circuit, when the area of the first display area increases, the length of the sliding rheostat connected to the circuit decrease. When the area of the first display area decreases, the length of the sliding rheostat connected to the circuit increases. If the end of the sliding rheostat close to the second side of the housing and the sliding end of the sliding rheostat are connected to the circuit, when the area of the first display area increases, the length of the sliding rheostat connected to the circuit increases. When the area of the first display area decreases, the length of the sliding rheostat connected to the circuit decreases.

In one embodiment, the first end of the display screen is fixed to the first side of the housing, the second end of the display screen is accommodated in the housing, and the second display area is located on a side of the first display area away from the first side of the housing. One end of the resistor element is fixedly connected to the second end of the display screen, and another end of the resistor element is fixed in the housing. When a display area (i.e., an area of the first display area) between the first end of the display screen and the second side of the housing in the display area of the display screen increases, a resistance of the resistor element changes along a third direction. When the display area (i.e., the area of the first display area) between the first end of the display screen and the second side of the housing in the display area of the display screen decreases, the resistance of the resistor element changes along the fourth direction. Therefore, the drive circuit can determine, based on the resistance change of the resistor element, the locations of the first display area and the second display area in the display area of the display screen. The third direction is opposite to the fourth direction.

Based on the above embodiment, in one embodiment, the resistor element includes a resistance wire. When the area of the first display area increases, a length of the resistance wire increases, and the resistance of the resistor element increases. When the area of the first display area decreases, the length of the resistance wire decreases, and the resistance of the resistor element decreases. Therefore, the drive circuit can determine, based on a resistance change of the resistance wire, the locations of the first display area and the second display area in the display area of the display screen.

In one embodiment, the resistor element includes a sliding rheostat. An end of the second display area away from the first display area is fixedly connected to a sliding end of the sliding rheostat. When the area of the first display area changes, the sliding end of the sliding rheostat slides on the sliding rheostat, so that a resistance length of the sliding rheostat connected to a circuit change. Specifically, when a length of the sliding rheostat connected to the circuit increases, a resistance of the sliding rheostat increases, when the length of the sliding rheostat connected to the circuit decreases, the resistance of the sliding rheostat decreases. Therefore, the drive circuit can determine, based on the resistance change of the sliding rheostat, the locations of the first display area and the second display area in the display area of the display screen.

In the above embodiment, if an end of the sliding rheostat close to the first side of the housing and the sliding end of the sliding rheostat are connected to the circuit, when the area of the first display area increases, the length of the sliding rheostat connected to the circuit increases, and when the area of the first display area decreases, the length of the sliding rheostat connected to the circuit decreases. If the end of the sliding rheostat close to the second side of the housing and the sliding end of the sliding rheostat are connected to the circuit, when the area of the first display area increases, the length of the sliding rheostat connected to the circuit decreases, and when the area of the first display area decreases, the length of the sliding rheostat connected to the circuit increases.

Figure 17:
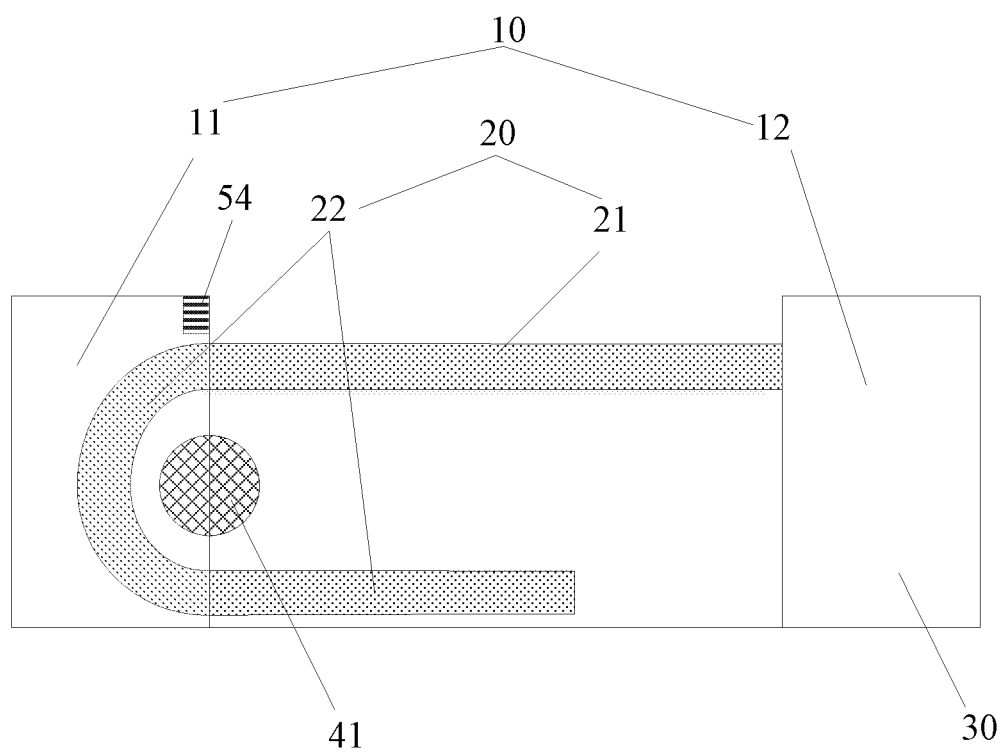
FIG. 17 illustrates a cross-sectional view of a display device provided by another embodiment of the present disclosure.

In one embodiment, the detection element includes an infrared signal detection element fixed to at least one of the first side and the second side of the housing. The infrared signal detection element is configured to emit infrared signals to the at least one of the second side and the first side of the housing and receive infrared signals reflected therefrom. Specifically, as shown in FIG. 17, when the infrared signal detection element 54 is fixed on the first side 11 of the housing 10, the infrared signal detection element 54 is configured to emit infrared signals to the second side 12 of the housing 10 and receive infrared signal reflected therefrom. When the infrared signal detection element is fixed on the second side 12 of the housing, the infrared signal detection element is configured to emit infrared signals to the first side 11 of the housing and receive the infrared signal reflected therefrom. The drive circuit is also configured to determine, based on the infrared signals emitted by and received by the infrared signal detection element, a distance between the first side of the housing and the second side of the housing, thereby determining the locations of the first display area and the second display area in the display area of the display screen. Specifically, as shown in FIG. 17, a display area between the first side 11 of the housing 10 and the second side 12 of the housing 10 is the first display area 21. A display area excluding the first display area 21 from the display area of the display screen 20 is the second display area 22.

Optionally, in one embodiment, the infrared signal detection element is an infrared sensor, which is not limited herein and depends on a specific situation.

Based on any of the above embodiments, in one embodiment, the drive circuit further determines, based on the area of the first display area, a refresh frequency of the first display area. The drive circuit provides drive signals to the first display area at a refresh frequency corresponding to the area of the first display area, thereby considering both a display requirement of the display screen and a power consumption of the display device.

Optionally, in one embodiment, when the area of the first display area is less than a first preset value, the drive circuit provides the drive signals to the first display area at a first refresh frequency. When the area of the first display area is greater than a second preset value, the drive circuit provides the drive signals to the first display area at a second refresh frequency. The second preset value is greater than or equal to the first preset value, and the first refresh frequency is greater than the second refresh frequency. Therefore, when the area of the first display area is relatively small, the drive circuit provides the drive signals to the first display area at a relatively large refresh frequency to improve a quality of a display screen in the first display area. When the area of the first display area is relatively large, the drive circuit provides the drive signals to the first display area at a relatively small refresh frequency to improve a battery life of the display device. In other embodiments, the drive circuit may also determine the refresh frequency of the first display area and provide the drive signals to the first display area in other ways.

Based on the above embodiment, in one embodiment, when the area of the first display area is less than a third preset value, the drive circuit also provides the drive signals to the first display area at a third refresh frequency. The third preset value is less than the first preset value, and the third refresh frequency is less than the first refresh frequency.

Therefore, when the display device displays reminder information such as time and weather, the drive circuit provides the drive signals to the first display area at a relatively small refresh frequency, thereby reducing a power consumption of the display device.

Based on any of the above embodiments, in one embodiment, when the area of the first display area gradually increases, the drive circuit provides the drive signals to the first display area at a fourth refresh frequency. When the area of the first display area increases to a fourth preset value and remains unchanged, the drive circuit provides the drive signals to the first display area at a fifth refresh frequency. The fourth refresh frequency is greater than the fifth refresh frequency. Therefore, when the area of the first display area gradually increases, the drive circuit provides the drive signals to the first display area at a relatively high refresh frequency. When the area of the first display area increases to the fourth preset value that is finally required, the drive circuit provides the drive signals to the first display area at the fifth refresh frequency that is lower than the fourth refresh frequency. Therefore, when the first display area is displaying a screen and the area of the first display area gradually increases, a user has a smoother stretch visual experience.

In one embodiment, the drive circuit further determines, based on the area of the first display area, a display mode corresponding to the area of the first display area and provides the drive signals to the first display area at a refresh frequency corresponding to the display mode. For example, when the area of the first display area is the fifth preset value, the drive circuit determines, based on the area of the first display area, that a display mode of the first display area is a movie mode and provides the drive signals to the first display area at a refresh frequency matching a movie viewing mode. When the area of the first display area is a sixth preset value, the drive circuit determines, based on the area of the first display area, that the display mode of the first display area is a game mode and provides the drive signals to the first display area at a refresh frequency matching a game viewing mode. Optionally, in one embodiment, when the display mode of the first display area is the movie mode, the drive circuit provides the drive signals to the first display area at a refresh frequency of 24 frames per second. When the display mode of the first display area is the game mode, the drive circuit provides the drive signals to the first display area at a refresh frequency of 120 frames per second.

As can be seen from the above, in the display device provided by the embodiments of the present disclosure, the drive circuit may provide the drive signals to the first display area at different refresh frequencies based on different areas of the first display area, so that a user can obtain a better viewing experience.

In summary, the display device provided by the embodiments of the present disclosure, when applied to part of the display area exposed outside the housing for displaying display content, and part of the display area accommodated in the housing for not displaying display content, control only the first display area to display without displaying the second display area through the drive circuit. Therefore, a power consumption of the drive circuit to drive the second display area for display can be saved, thereby reducing a power consumption of the display device.

Figure 18:
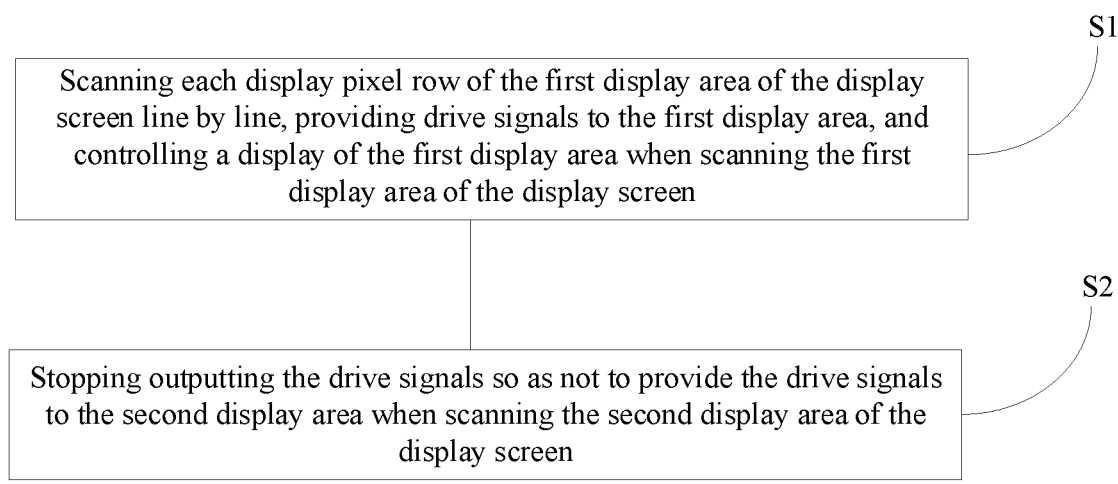
FIG. 18 illustrates a flow chart of a driving method provided by another embodiment of the present disclosure.

In addition, one embodiment of the present disclosure also provides a driving method, which is applied to a display device provided by any of the above embodiments. Specifically, as shown in FIG. 18, the driving method includes the following steps.

In S1: scanning each display pixel row of the first display area of the display screen line by line, providing drive signals to the first display area, and controlling a display of the first display area when scanning the first display area of the display screen.

In S2: stopping outputting the drive signals so as not to provide the drive signals to the second display area when scanning the second display area of the display screen.

In the driving method, when the display device is driven, if only part of the display area of the display device is configured for display, only part of the display device configured for display is provided with the drive signals, and part of the display device not configured for display is not provided with the drive signals, to reduce a power consumption of the display device.

Based on the above embodiment, in one embodiment, the display device further includes a detection element. The driving method further includes detecting locations of the first display area and the second display area in the display area of the display screen by using the detection element in the display device, to facilitate the drive circuit to determine a period for outputting the drive signals and a period for stopping outputting the drive signals.

Based on the above embodiment, in one embodiment, using the detection element in the display device to detect the locations of the first display area and the second display area in the display area of the display screen is also beneficial for the drive circuit to determine the area of the first display area, and determine the refresh frequency of the first display area based on the area of the first display area.

Optionally, based on the above embodiment, in one embodiment, the scanning of each display pixel row of the first display area of the display screen line by line when scanning the first display area of the display screen further includes: scanning each display pixel row in the first display area of the display screen line by line at a first refresh frequency and providing drive signals to the first display area if an area of the first display area is smaller than a first preset value; and scanning each display pixel row of the first display area of the display screen line by line at a second refresh frequency and providing drive signals to the first display area if the area of the first display area is greater than the second preset value. The second preset value is greater than or equal to the first preset value, and the first refresh frequency is greater than the second refresh frequency.

In the above embodiment, when the area of the first display area is relatively small, the drive circuit provides the drive signals to the first display area at a relatively large refresh frequency, to improve a quality of the display image of the first display area. When the area of the first display area is relatively large, the drive circuit provides the drive signals to the first display area at a relatively small refresh frequency to improve a battery life of the display device. In other embodiments of the present disclosure, the drive circuit may also determine the refresh frequency of the first display area and provide the drive signals to the first display area in other ways.

Based on the above embodiment, in one embodiment, the scanning of each display pixel row of the first display area of the display screen line by line when scanning the first display area of the display screen includes: scanning each display pixel row of the first display area of the display screen line by line at a third refresh frequency and providing drive signals to the first display area if the area of the first display area is smaller than a third preset value. The third preset value is less than the first preset value, and the third refresh frequency is less than the first refresh frequency, so that when the display device displays reminder information such as time and weather, the drive circuit provides the drive signals to the first display area at a relatively small refresh frequency, thereby reducing a power consumption of the display device. For example, when the display device is turned on and only display information of a main page of a top display area is displayed, the drive circuit provides the drive signals to the first display area at a relatively small third frequency, thereby reducing a power consumption of the display device.

In one embodiment, the scanning of each display pixel row of the first display area of the display screen line by line when scanning the first display area of the display screen includes: scanning each display pixel row of the first display area of the display screen line by line at a fourth refresh frequency and providing drive signals to the first display area if the area of the first display area gradually increases; and scanning each display pixel row in the first display area of the display screen line by line at a fifth refresh frequency and providing drive signals to the first display area if the area of the first display area increases to a fourth preset value and remains unchanged. The fourth refresh frequency is greater than the fifth refresh frequency. Therefore, when the area of the first display area gradually increases, the drive circuit provides the drive signals to the first display area a relatively high refresh frequency. When the area of the first display area increases to the fourth preset value of the final requirement, the drive circuit provides the drive signals to the first display area at the fifth refresh frequency that is lower than the fourth refresh frequency. Therefore, when the first display area is displaying a screen and the area of the first display area gradually increases, a user has a smoother stretched visual experience.

In one embodiment, the scanning of each display pixel row of the first display area of the display screen line by line when scanning the first display area of the display screen includes: determining, based on the area of the first display area, a display mode corresponding to the area of the first display area, scanning each display pixel row of the first display area of the display screen line by line at a refresh frequency corresponding to the display mode, and providing drive signals to the first display area. Therefore, both a viewing experience and a power consumption of the display device are considered.

When the area of the first display area is the fifth preset value, the drive circuit determines, based on the area of the first display area, that the display mode of the first display area is a movie mode and provide drive signals to the first display area at a refresh frequency matching a movie viewing mode. When the area of the first display area is the sixth preset value, the drive circuit determines, based on the area of the first display area, that the display mode of the first display area is a game mode and provide the drive signals to the first display area at a refresh frequency matching a game viewing mode. Optionally, in one embodiment, when the display mode of the first display area is the movie mode, the drive circuit provides the drive signals to the first display area at a refresh frequency of 24 frames per second. When the display mode of the first display area is the game mode, the drive circuit provides the drive signals to the first display area at a refresh frequency of 120 frames per second.

In summary, in the driving method provided by the embodiments of the present disclosure, when the display device is driven, if only part of the display area of the display device is configured for display, only part of the display device configured for display is provided with drive signals, and part of the display device not configured for display is not provided with the drive signals, to reduce a power consumption of the display device.

The display device and the driving method thereof provided by the embodiments of the present disclosure are configured for displaying display content when part of the display area is exposed outside the housing. When part of the display area is accommodated in the housing, the drive circuit only controls the first display area to display, and controls the second display area not to display. Therefore, a power consumption of the drive circuit to drive the second display area for display can be saved, thereby reducing a power consumption of the display device.

Various parts in the present specification are described in a parallel and progressive way. Each part focuses on differences from other parts. Same or similar parts between the various parts can be referred to each other.

For the above description of the disclosed embodiments, features described in the embodiments of the present specification can be replaced or combined with each other, so that a person skilled in the art can implement or use the present disclosure. Various modifications to these embodiments will be obvious to a person skilled in the art. General principles defined herein can be implemented in other embodiments without departing from the spirit or scope of the present disclosure. Therefore, the present disclosure may not be limited to the embodiments shown herein but should conform to a widest scope consistent with the principles and novel features disclosed herein.

What is claimed is:

1. A driving method for a display device, the display device comprising:

a housing, comprising a first side and a second side opposite to the first side in a first direction;

a display screen, comprising a first end and a second end, at least one of the first end and the second end being accommodated in the housing, wherein a first display area in a display area of the display screen is located between the first side and the second side, and a second display area in the display area of the display screen is accommodated in the housing; and a drive circuit, configured, when the display screen displays an image, to provide drive signals to the first display area and control a display of the first display area without providing drive signals to the second display area, wherein the drive method includes:

scanning each display pixel row of the first display area of the display screen line by line, providing the drive signals to the first display area, and controlling a display of the first display area when scanning the first display area of the display screen; and stopping outputting the drive signals so as not to provide the drive signals to the second display area when scanning the second display area of the display screen, wherein the scanning of each display pixel row of the first display area of the display screen line by line when scanning the first display area of the display screen further comprises:

scanning each display pixel row of the first display area of the display screen line by line at a fourth refresh frequency and providing the drive signals to the first display area if the area of the first display area gradually increases; and scanning each display pixel row in the first display area of the display screen line by line at a fifth refresh frequency and providing the drive signals to the first display area if the area of the first display area increases to the fourth preset value and remains unchanged; wherein:
the fourth refresh frequency is greater than the fifth refresh frequency.

2. The driving method according to claim 1, wherein the display screen comprises a plurality of scan lines extending in a second direction and a plurality of data lines extending in the first direction, and the second direction intersects the first direction.

3. The driving method according to claim 2, wherein the drive circuit is configured to provide scan drive signals for scan lines in the first display area and control the display of the first display area without providing the scan drive signals for scan lines in the second display area.

4. The driving method according to claim 3, wherein the drive circuit comprises a first circuit configured to provide scan drive signals required by the display area of the display screen and a second circuit configured to control an on state of a path between the first circuit and the display area of the display screen.

5. The driving method according to claim 4, wherein the second circuit is in an on state, and the first circuit provides scan drive signals to the first display area without providing the scan drive signals to the second circuit.

6. The driving method according to claim 4, wherein the first circuit provides scan drive signals to the first display area and the second display area, the second circuit is in an on state when the first circuit provides the scan drive signals to the first display area and is in an off state when the first circuit provides the scan drive signals to the second display area.

7. The driving method according to claim 4, wherein the first circuit comprises a control circuit, a scan line drive circuit, and a data line drive circuit, and when the drive circuit does not provide the drive signals to the second display area, the control circuit outputs stop and reset signals to the scan line drive circuit so that the scan line drive circuit does not output scan drive signals.

8. The driving method according to claim 1, further comprising:
a detection element, configured to determine locations of the first display area and the second display area in the display area of the display screen.

9. The driving method according to claim 8, wherein:
the display screen comprises a touch detection element comprising at least one conductive member fixed on at least one of the first side and the second side of the housing, touch signals are located between the at least one conductive member and the touch detection element; and
the drive circuit is further configured to determine, based on the touch signals, a dividing line between the first display area and the second display area, and determine the locations of the first display area and the second display area in the display area of the display screen.

10. The driving method according to claim 8, wherein:
the detection element comprises a resistor element fixedly connected to an end of the second display area away from the first display area; and
the drive circuit is further configured to determine, based on a resistance change of the resistor element, the locations of the first display area and the second display area in the display area of the display screen.

11. The driving method according to claim 10, wherein:
the resistor element includes a resistance wire, when an area of the first display area increases, a length of the resistance wire increases, and when the area of the first display area decreases, the length of the resistance wire decreases; and
the drive circuit determines, based on the resistance change of the resistance wire, the locations of the first display area and the second display area in the display area of the display screen.

12. The driving method according to claim 10, wherein:
the resistor element comprises a sliding rheostat, the end of the second display area away from the first display area is fixedly connected to a sliding end of the sliding rheostat, and when an area of the first display area changes, the sliding end of the sliding rheostat slides on the sliding rheostat; and
the drive circuit determines, based on the resistance change of the sliding rheostat, the locations of the first display area and the second display area in the display area of the display screen.

13. The driving method according to claim 8, wherein:
the detection element comprises an infrared signal detection element fixed on at least one of the first side and the second side of the housing, the infrared signal detection element is configured to emit infrared signals to the at least one of the second side and the first side of the housing and receive infrared signals reflected therefrom; and
the drive circuit is further configured to determine, based on the infrared signals emitted and received by the infrared signal detection element, a distance between the first side and the second side, and determine the locations of the first display area and the second display area in the display area of the display screen.

14. The driving method according to claim 1, wherein when an area of the first display area is smaller than a first preset value, the drive circuit provides drive signals to the first display area at a first refresh frequency, when the area of the first display area is greater than a second preset value, the drive circuit provides drive signals to the first display area at a second refresh frequency, the second preset value is greater than or equal to the first preset value, and the first refresh frequency is greater than the second refresh frequency.

15. The driving method according to claim 14, wherein the drive circuit further provides drive signals to the first display area at a third refresh frequency when the area of the first display area is less than a third preset value, the third preset value is less than the first preset value, and the third refresh frequency is less than the first refresh frequency.

16. The driving method according to claim 1, wherein the drive circuit further determines, based on the area of the first display area, a display mode corresponding to the area of the first display area and provides drive signals to the first display area at a refresh frequency corresponding to the display mode.

17. The method according to claim 1, further comprising:
detecting locations of the first display area and the second display area in the display area of the display screen by using a detection element in the display device.

18. The method according to claim 1, wherein the scanning of each display pixel row of the first display area of the display screen line by line when scanning the first display area of the display screen comprises:
scanning each display pixel row in the first display area of the display screen line by line at a first refresh frequency and providing drive signals to the first display area if an area of the first display area is smaller than a first preset value; and scanning each display pixel row of the first display area of the display screen line by line at a second refresh frequency and providing drive signals to the first display area if the area of the first display area is greater than a second preset value; wherein:

the second preset value is greater than or equal to the first preset value, and the first refresh frequency is greater than the second refresh frequency.

19. The method according to claim 18, wherein the scanning of each display pixel row of the first display area of the display screen line by line when scanning the first display area of the display screen further comprises:

scanning each display pixel row of the first display area of the display screen line by line at a third refresh frequency and providing drive signals to the first display area if the area of the first display area is smaller than a third preset value, the third preset value being less than the first preset value, and the third refresh frequency being less than the first refresh frequency.

20. The method according to claim 19, wherein when the first display area displays reminder information, the first display area of the display screen is scanned line by line at the third refresh frequency.

21. The method according to claim 1, wherein the scanning of each display pixel row of the first display area of the display screen line by line when scanning the first display area of the display screen further comprises:

determining, based on the area of the first display area, a display mode corresponding to the area of the first display area;

scanning each display pixel row of the first display area of the display screen line by line at a refresh frequency corresponding to the display mode; and providing drive signals to the first display area.

22. The method according to claim 1, wherein the drive circuit is configured to provide the drive signals to the first display area at different frequencies based on different areas of the first display area.

* * * * *